Aug. 8, 1961   G. M. GUSTIN   2,995,161
RIP SAW ENCLOSURE

Filed Sept. 2, 1958   4 Sheets-Sheet 1

INVENTOR.
GEORGE M. GUSTIN
BY
*Albert L. Jeffers*
ATTORNEY

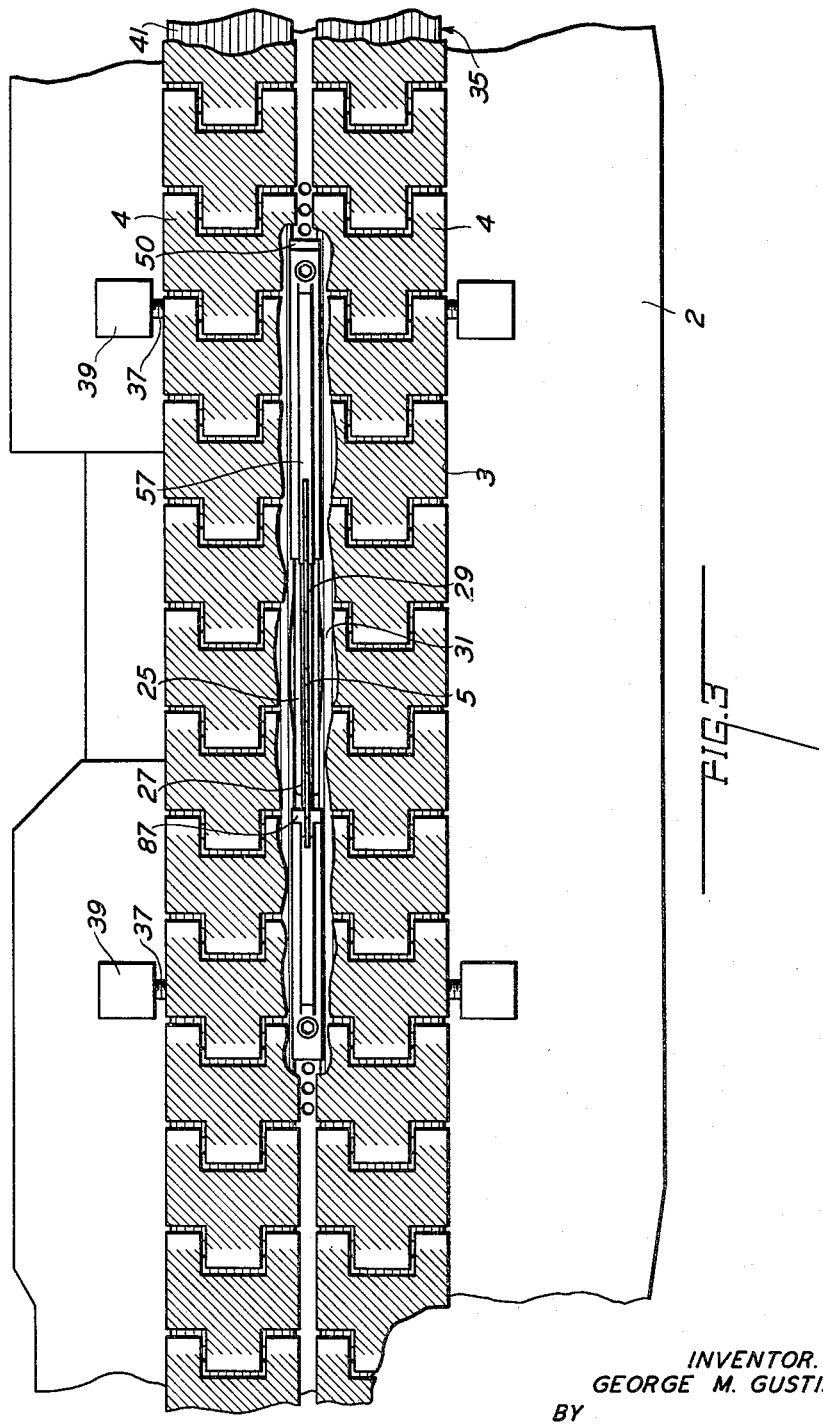

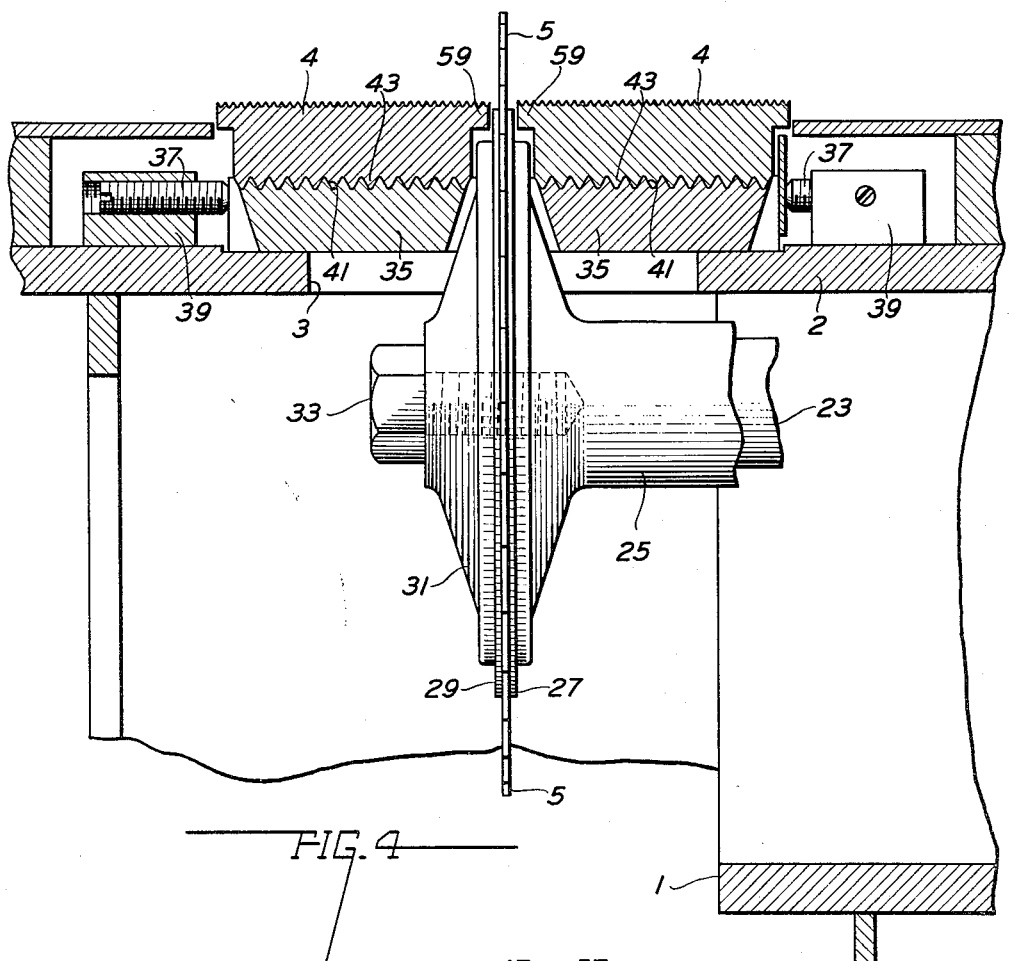
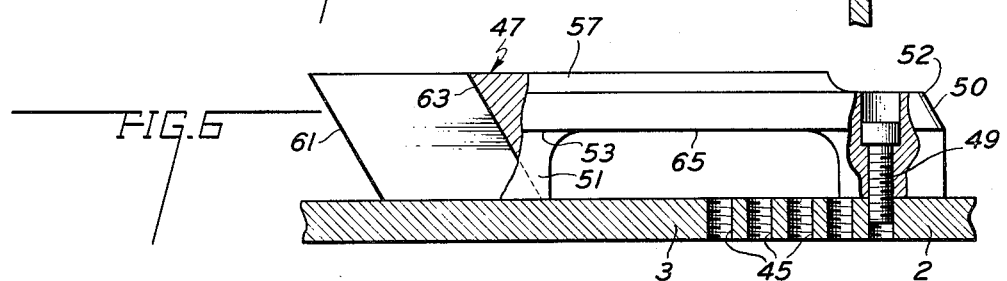
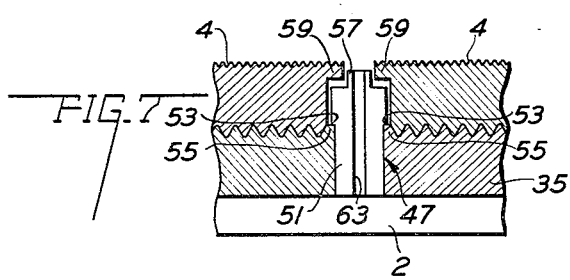

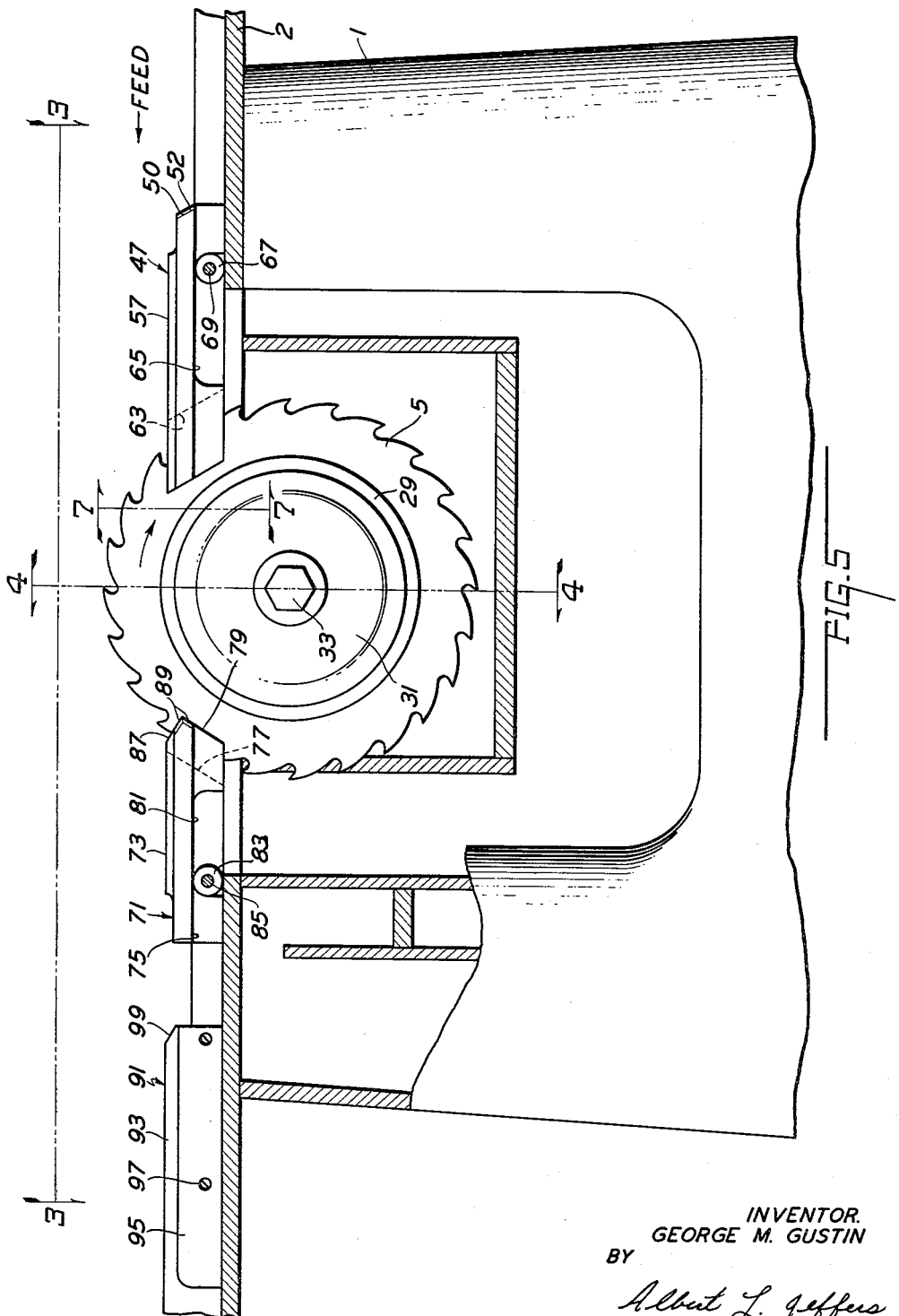

United States Patent Office 2,995,161
Patented Aug. 8, 1961

2,995,161
RIP SAW ENCLOSURE
George M. Gustin, deceased, late of Wabash, Ind., by Sylvia M. Gustin, representative, 1471 Vernon St., Wabash, Ind.
Filed Sept. 2, 1958, Ser. No. 758,236
6 Claims. (Cl. 143—49)

This invention relates to means for reducing, as much as possible, the space between a revolving saw blade and the structures which are usually provided for supporting and feeding stock to the saw, so as to prevent jamming of the saw and to control the flow of sawdust.

It is an object of the invention to provide throat inserts at the front and rear of the saw blade which cooperate with stiffening collars on the saw blade to enclose the blade.

A further object of the invention is to dispose the throat inserts close to the inner edges of the feed chains to hold them away from the saw blade.

Another object of the invention is to dispose the throat inserts with their upper surfaces flush with those of the feed chains to eliminate recesses in which slivers might collect so as to be later kicked back by the saw toward the operator.

Yet another object of the invention is to provide throat pieces which extend in depth from the under surface of the stock downwardly past the feed chains and the races therefor, to define a chute for the escape of dust, thus preventing it from depositing in the chains and their races.

Still another object of the invention is to provide throat inserts of a material which can be cut by the saw without damage thereto, so that the saw blade will finish the slots in the throat pieces to minimum clearance with respect to itself.

A further object of the invention is to provide throat inserts which cooperate with stiffening collars on the saw to provide maximum support for the stock on all sides of and closely adjacent the saw blade.

These and other objects will become apparent from a study of this specification and the drawings which are attached hereto, made a part hereof and in which:

FIGURE 3 is a plan view of the saw blade and feed chains fitted with the stiffening collars and throat inserts;

FIGURE 4 is a vertical sectional view taken substantially on the line 4—4 of FIGURE 5;

FIGURE 5 is a side elevation with parts broken away to show the relation between the saw blade, stiffening collars and throat inserts;

FIGURE 6 (Sheet 3) is an elevation with parts in section of a throat piece;

FIGURE 7 is a sectional view taken substantially on line 7—7 of FIGURE 5 showing a throat insert and its relation to the feed chains and their races to illustrate the dust chute provided by the insert.

Figure 1:
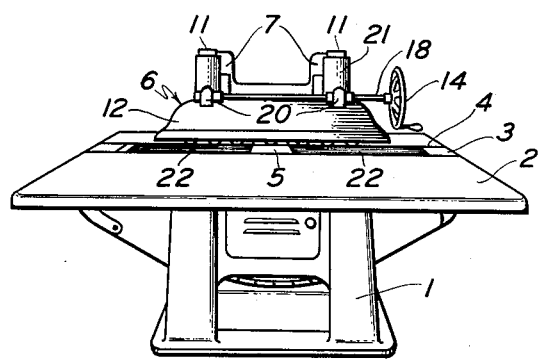
FIGURE 1 is a side perspective view of a rip saw machine of the type employing the invention.
Figure 2:
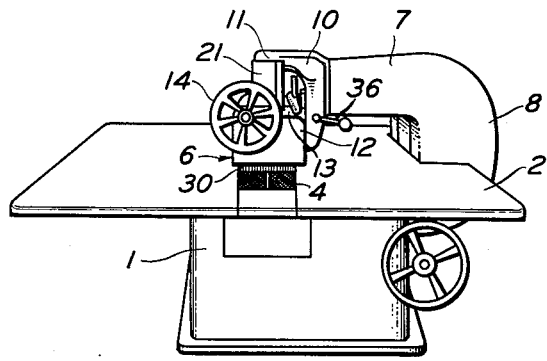
FIGURE 2 is a front perspective view of the structure of FIGURE 1.

Referring first to FIGURES 1, 2 and 3 depicting the general structure of the machine, numeral 1 indicates the base carrying at its top a suitable table 2 provided with a center opening 3 in which operate the feed chains 4 that feed the stock to the rotary saw 5 which projects above the top of the table and chains. The stock is pressed against the chains by a presser head 6 which is mounted for vertical adjustment on a pair of overhanging arms 7 which are rigidly supported on standards 8 which are fixed to base 1.

A bracket 10 is bolted to the front face of each arm 7 to support an enlarged, upright, cylindrical member 11. The presser head comprises an elongated housing 12 having a gear casing 13 adjacent each end through which projects the shaft 18. A screw (not shown) projects upwardly from each casing and enters a threaded hole in each cylindrical member 11 so that rotation of shaft 18 by the handwheel 14 will actuate appropriate gearing to cause the presser head to be raised or lowered with respect to the table.

A plurality of rollers 22 are mounted in the housing 12 for rotation about axes which are parallel to that of the saw blade and are resiliently urged outwardly of the housing, toward the chains 4 by any suitable mechanism.

The general structure described above is shown in detail in my Patent No. 2,623,559, issued December 30, 1952.

Referring next to FIGURES 3, 4, 5 and 7, it will be seen that the saw blade 5 is mounted upon the usual arbor 23 by means of an inner saw collar 25 which is fixed to the arbor and a stiffening collar 27 on one side of the saw blade and second stiffening collar 29 and outer saw collar 31 on the other. This assembly is held together by a screw 33. The arbor and assembly rotate about the common axis and are movable up and down so as to project or withdraw the saw with respect to the stock to accommodate stock of different thickness.

Chain races 35 are mounted on the bed 2, on either side of the saw blade and may be adjusted relative to the blade by the screws 37 mounted in blocks 39 which are fixed to the bed. The races define a plurality of V-grooves 41, which extend parallel to the saw blade or substantially so, depending upon the adjustments mentioned, and slidably receive corresponding V-ribs 43 which project from the lower surfaces of the feed chains 4 and are guided therein.

FIGURES 6 and 7 show the detailed construction of the front throat insert. The bed 2 is provided with a plurality of spaced, tapped holes 45 whose vertical axes lie substantially in the plane of the saw blade.

The front throat insert 47 rests flat on the bed and is held thereon by a screw 49 which is screwed into one of the holes 45 (FIG. 6). As shown in FIGURE 7, the shank 51 of the insert fits between the races 35 and is provided with projecting shoulders 53 which rest upon the adjacent flattened ribs 55 of the races. An upwardly projecting tongue 57 is formed lengthwise of the insert and the chains are provided with lateral projections 59 which extend toward the tongue and overlie the shank. Thus the chains are permitted to approach the sides of the saw blade closely but are prevented from contacting it by the tongue 57.

The end of the front insert adjacent the saw blade (left end FIG. 6) is inclined at 61 so as to form an angle of about 60 degrees with the rib 47. This end of the insert is also provided with a relatively long vertical slot 63 to receive the saw blade and to guide dust to the saw pit.

The shank 51 is cut away from the bottom and up to the level of the shoulders 53 to form an elongated notch 65 which receives a cylindrical race spacer 67 which is mounted by a horizontal screw 69 which enters one of the races 35 as shown in FIGURE 5. The slot is long enough to permit the full endwise adjustment of the insert by means of screw 49 and holes 45. The upper leading end of the front insert is bevelled at 50 at an angle of approximately 30 degrees from the vertical, and its lateral edges are chamfered at 52 on each side. This bevel deflects upwardly any pieces which might tend to jam against the insert. The chamfers prevent slivers from jamming between the insert and the chains.

Viewing FIGURE 5, it will be seen that the rear insert 71 is similar in construction to insert 47 and is provided with a tongue 73, shoulders 75, slot 77, inclined end 79, notch 81, spacer 83 and screw 85. This insert differs from the front insert in that the top front end of the insert is inclined downwardly at an angle of about 30 degrees from the horizontal, as shown at 87, so that it intersects the end 79 at a right angle. Both legs of this right angle on both sides of the insert are provided with a 45 degree chamfer so as to prevent the chains or stock leaving the saw from snagging on the insert as they otherwise might if sharp corners and edges were presented to the oncoming chains or stock. The incline 87 forces slivers upwardly as they leave the saw stiffeners, so that they will travel with the chain.

Slot 77 need not be so deep longitudinally as the slot 63 in the front insert because most of the dust is thrown from the saw ahead of this insert, and there is no need to provide a path for the dust as in the case of the front insert.

This insert also differs from the front insert in that it is shorter. The notch 81 is shorter, but the same number of longitudinal adjustment steps, having the same interval, are provided for both inserts. It will be noted from FIGURE 5 that the saw blade enters the slot 63 further than it does slot 77 because the direction of saw rotation tends to carry chips and dust downwardly with respect to the front insert and one function of the insert is to prevent such action. The saw is moving in a direction to eject dust, etc., from the rear insert and little dust, if any, is brought upwardly from the saw pit by the blade so that it is not necessary for the insert to provide a dust chute. It is not necessary for the insert to extend a great distance over the saw to perform the function of preventing springing or bending of the blade.

Both throat inserts are preferably made of bronze, cast brass or the like, and the slots 63 and 77 are made slightly narrower than the thickness of the saw blade so that the blade will finish the slots to a width which will closely fit the saw, and so that the saw will not be damaged in the process. It is preferred to have the saw teeth tipped with a carbide metal.

A rear chain guide indicated by 91, made up of a tongue plate 93 flanked on either side by a spacer plate 95, is mounted between the chain races 35 by means of screws 97. It is located to the rear of and in lengthwise spaced relation with respect to the rear insert, a distance sufficient to permit full longitudinal adjustment of the rear insert. The leading corner 99 of the tongue plate is cut away to make about a 30 degree angle with the horizontal. This plate is substantially the same height as tongues 57 and 73 of the throat inserts but the top edges of the spacer plates are somewhat below the level of the bases of these tongues to provide additional clearance between the spacer plates and the chains.

*Operation*

As will be seen from FIGURE 4, the projections 59 of the chains pass very closely alongside the outer surfaces of the stiffening collars 27, 29 and they overlie the peripheral edges of the saw collars. Thus, thin slivers of wood and dust are deterred from entering these spaces.

A similar fit is shown in FIGURE 7 between the throat inserts and chains and between the saw blade and the inserts. The plan view, FIGURE 3, shows the substantial completeness of the enclosure of the blade by the structure described which prevents slivers from entering.

Since slivers of wood are prevented from reaching the blade, they cannot be ejected toward the operator or otherwise and cannot jam and injure the blade.

As shown in FIGURE 7, the throat inserts fit closely against the inside edges of the feed chains and prevent lateral movement of the chains into contact with the saw blade.

The stiffening collars support the saw blade to a point which is closely adjacent the underside of the stock to provide maximum support for the saw from the arbor. Further support of the blade is afforded by the sides of the inserts which embrace the surfaces of the blade adjacent its periphery.

Also, since the throat inserts form a continuation of the top surfaces of the feed chains, they eliminate any recesses into which thin slivers could enter to be kicked back upon reaching the saw.

Since the throat inserts extend from the under surface of the stock down between the feed chains and chain races as shown in FIGURE 7, the slots thereof, particularly slot 63, define a chute through which the sawdust must travel. It is thus prevented from impinging upon and collecting in the chains and races to foul them and to absorb the lubricant which is used on them.

The throat inserts are readily adjustable to accommodate saws of different diameters. This can be quickly done by merely removing the screws 49, moving the inserts to the proper longitudinal position and reinserting the screws.

The leading ends of the throat inserts are bevelled and their edges are chamfered so as to deflect slivers and stock to positions in which they will travel with the chains and will not snag on the throat inserts or jam between them and the chains.

It is obvious that various changes may be made in the form, structure and arrangements of parts without departing from the spirit of the invention. Accordingly, applicant does not desire to be limited to the specific embodiment disclosed herein primarily for purposes of illustration, but instead he desires protection falling fairly within the scope of the appended claims.

I claim:

1. In a woodworking machine comprising a table defining a central opening, a rotary arbor mounted below said opening, a rotary saw blade mounted on said arbor so as to extend through said opening, a chain race mounted on said table on each side of said blade, a stock feeding chain supported on each race for longitudinal movement past said blade, substantially parallel thereto, said chains each having a stock supporting surface which is undercut adjacent the blade to provide projections extending toward said blade and forming a gap between the chains and additional gaps with the blade, the improvement including a throat insert mounted on the table entirely at one side of the saw arbor between said chains in alignment with said blade and extending beyond its periphery, said insert having a vertical slot extending through the end of the insert nearest the blade for closely receiving the blade and defining a channel for dust extending from the surfaces of the chains, past said chains and races to the central opening, said insert including an upwardly extending, longitudinal tongue disposed in the gap between the projections of the chains and having a width sufficient to substantially fill said gap.

2. The structure defined by claim 1 wherein the top portion of said tongue extends substantially to the stock supporting surface.

3. In a woodworking machine comprising a table defining a central opening, a rotary arbor mounted below said table, a rotary saw blade mounted on said arbor so as to extend through said opening, a chain race mounted on said table on each side of said blade, a stock feeding chain supported by each race for longitudinal movement past said blade, substantially parallel thereto, each chain having a stock supporting surface which is undercut laterally, adjacent the blade, to provide projections extending toward said blade and defining a gap between them and additional gaps with said blade, the improvement including stiffening collars mounted on said arbor on each side of said blade and extending into said additional gaps, said collars being of a thickness to substantially fill said additional gaps, a first throat insert mounted on the table between said chains in alignment with and forward of said blade, said first insert having a vertical slot extending through the end of the insert nearest the blade for closely receiving the blade and defining a channel for dust extending from the surfaces of the chains, past said chains and races to the central opening, said first insert including an upwardly extending, longitudinal tongue disposed in the gap between the projections and having a width sufficient to substantially fill said gap.

4. The structure defined by claim 3 wherein a second throat insert is disposed rearwardly of said blade and the end of said second insert nearest the blade defines a vertical slot adapted to closely receive the blade, the portions of the insert defining the slot having a width sufficient to substantially fill said additional gaps, the end of said insert adjacent the saw being inclined downwardly away from the saw so as to lie substantially parallel to a tangent to said stiffening collars.

5. A throat insert of the kind described which is adapted to be inserted in a saw table and comprises an elongated body of metal having a generally rectangular cross-section surmounted by an upwardly and longitudinally extending tongue having a width less than that of the body and extending upward no farther than the top of the table when the insert is in position, one end of said body defining a vertical slot extending through the end of the insert and tongue to closely receive a saw blade.

6. The structure defined by claim 5 wherein said body defines a longitudinally and outwardly extending flange on each side, disposed adjacent the top portion of said body but below said tongue.

References Cited in the file of this patent

UNITED STATES PATENTS

| | | |
|---|---|---|
| 508,515 | Graham et al. | Nov. 14, 1893 |
| 1,241,871 | Meyers | Oct. 2, 1917 |
| 1,402,915 | Zluticky | Jan. 10, 1922 |
| 1,713,096 | Schott | May 14, 1929 |
| 2,623,559 | Gustin | Dec. 30, 1952 |
| 2,635,657 | Dietrich | Apr. 21, 1953 |
| 2,709,463 | Gustin | May 31, 1955 |
| 2,873,773 | Gaskell | Feb. 17, 1959 |